(12) United States Patent  
Erickson et al.

(10) Patent No.: US 8,820,862 B1  
(45) Date of Patent: Sep. 2, 2014

(54) FLOOR MOUNTED ATTENDANT STATION

(71) Applicant: The Boeing Company, Seal Beach, CA (US)

(72) Inventors: Harold Glenn Erickson, Mukilteo, WA (US); Tina Marie Lanfear, Hansville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/665,793

(22) Filed: Oct. 31, 2012

(51) Int. Cl.  
*A47B 43/00* (2006.01)

(52) U.S. Cl.  
USPC ........................................ 312/257.1

(58) Field of Classification Search  
USPC .............. 244/118.1, 118.5, 118.6; 312/257.1–259, 262–264, 265.5  
See application file for complete search history.

(56) References Cited

U.S. PATENT DOCUMENTS

| | | | |
|---|---|---|---|
| 4,460,215 A | 7/1984 | Chamberlain et al. | |
| 4,913,487 A | 4/1990 | Breckel et al. | |
| 5,083,727 A * | 1/1992 | Pompei et al. | 244/118.6 |
| 7,182,291 B2 | 2/2007 | Westre et al. | |
| D604,254 S | 11/2009 | Lanfear et al. | |
| D610,554 S | 2/2010 | Lanfear | |
| D611,005 S | 3/2010 | Lanfear et al. | |
| D611,006 S | 3/2010 | Lanfear et al. | |
| D615,045 S | 5/2010 | Lanfear et al. | |
| D631,446 S | 1/2011 | Lanfear et al. | |
| 8,047,467 B2 | 11/2011 | Erickson et al. | |
| 8,240,606 B2 | 8/2012 | Westre et al. | |
| 2006/0076858 A1* | 4/2006 | Nohl | 312/257.1 |

* cited by examiner

*Primary Examiner* — Matthew Ing  
(74) *Attorney, Agent, or Firm* — Parsons Behle & Latimer

(57) ABSTRACT

A storage unit that may be used in place of an attendant seat, fits into the approximate space of the attendant seat and may employ the same attachment system for securing the storage unit. The storage unit comprises an enclosure having a door and a mounting bracket. The storage unit has a profile that may be configured to match that of a floor-mounted attendant seat, wherein the storage unit may be used to replace the floor-mounted attendant seat. The enclosure may be formed having a resilient structure that forms a compartment, a front wall enclosing the area of the compartment, at least one vertical rail, a top cap. The storage unit further comprises a mounting bracket and a plurality of fasteners for attaching the storage unit to a support frame.

20 Claims, 8 Drawing Sheets

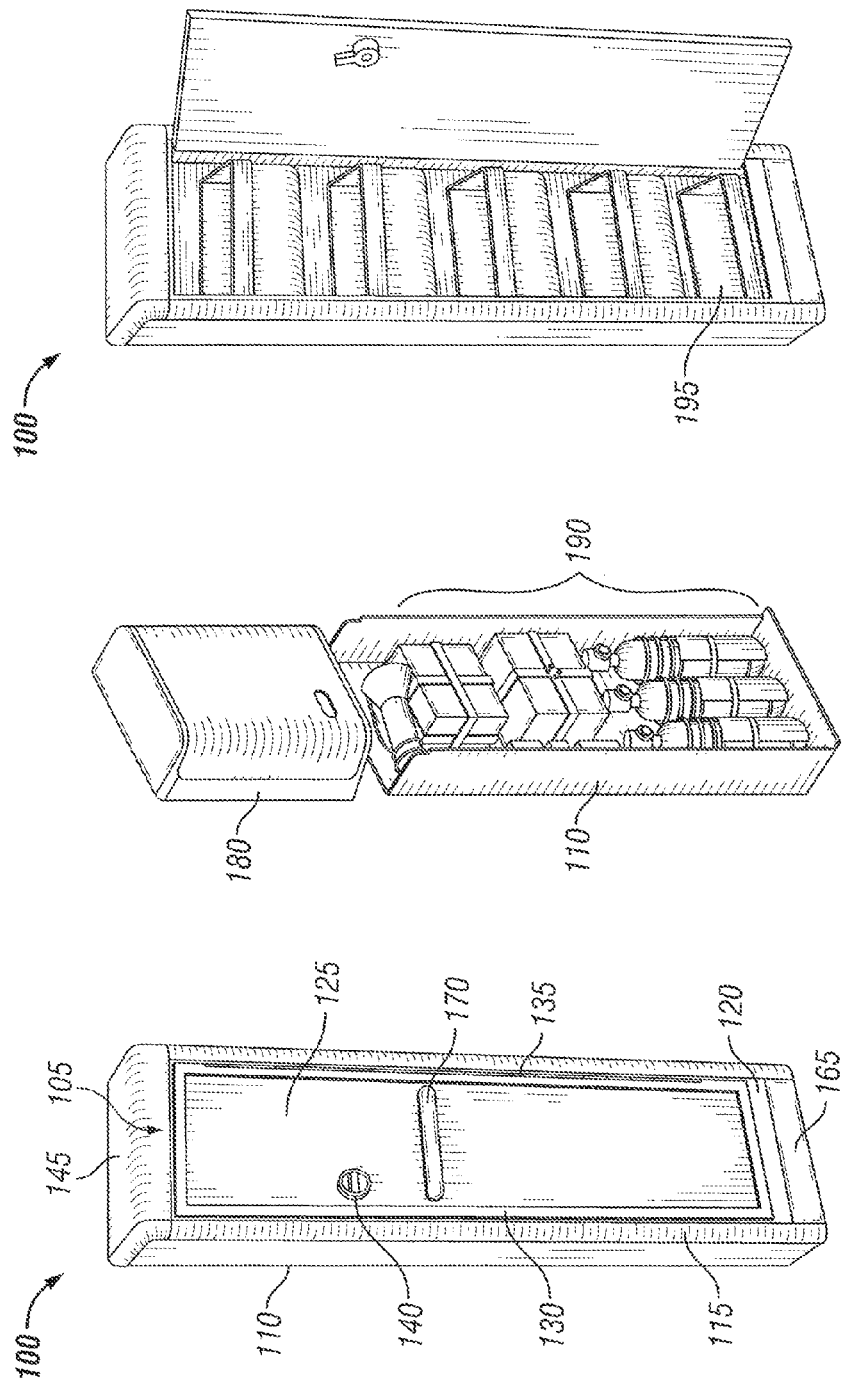

FLOOR MOUNTED ATTENDANT STATION

FIELD

The present disclosure relates generally to an apparatus and method for providing modular storage space in accessible areas of a passenger aircraft.

BACKGROUND

Passenger aircraft are subject to numerous design constraints, many of which are in direct conflict with each other. For example, with respect to passenger cabin design, there is inherent conflict between economic considerations and passenger demands for accessible storage space. These conflicting interests have a direct impact on other design issues as well, including the storage of items used by the flight crew.

One example of a class of items with particular storage requirements is emergency equipment. This may include, for example, fire extinguishers, portable oxygen tanks, first aid kits, and other safety equipment. These items are often stored in or adjacent to the galley, which is already tightly arranged with storage and equipment necessary for cabin service. Other locations where emergency equipment is stored include closets and overhead bins, impinging on passenger storage, and at door entrances, where the equipment can cause congestion or other incidents.

Accordingly, there is a present need in the field of aircraft passenger cabin design to provide an improved method for storing additional equipment.

SUMMARY

The present disclosure provides an apparatus and method for using modular storage space in passenger aircraft. In particular, the present disclosure describes a storage unit that may be used in place of an attendant seat, wherein the storage unit fits into the approximate space of the attendant seat and employs the same attachment system for securing the storage unit. The apparatus and method of the present disclosure may be used in other advantageous configurations, as will be apparent to one with skill in the art.

The apparatus and method of the present disclosure provides convenient storage of, and enables easy access to, emergency equipment and/or other miscellaneous items by flight attendants. The present disclosure provides many advantages over the prior art, including but not limited to, aesthetic and functional storage in high traffic areas, increased storage capacity for flight attendants, reduced clutter in the doorway areas of the cabin, and flexibility to change the use of space according to changing requirements, etc. In sum, present disclosure addresses the present need for more storage capacity without affecting revenue seating and overhead stowage bin capacity.

One aspect of the present disclosure provides a storage unit configured to be placed in an accessible area of a passenger aircraft comprising an enclosure with a door and a mounting bracket. The enclosure has a profile, (i.e., outward manifest spatial attributes), that matches available space in the aircraft. In particular, the profile may be configured to match that of a floor-mounted attendant seat, wherein the storage unit may be used to replace the floor-mounted attendant seat. The enclosure may be formed having a resilient structure that forms a compartment, a front wall enclosing the area of the compartment, at least one vertical rail, a top cap, and/or a kickstrip. The door may be located in the front wall and be provided with a latch for securing the door. The mounting bracket may be formed integral to the enclosure or may be provided as a separate component, wherein the components are separable when not fully assembled.

Another aspect of the present disclosure provides a storage system forming a modular storage unit of a passenger aircraft. The system comprises an enclosure with a door and a latch, a mounting bracket located at the base of the enclosure, and a plurality of fasteners. The system also comprises a support frame, which may include one or more floor joists, wherein the plurality of fasteners are used to attach the mounting bracket to the support frame. The system may further comprise a plurality of secondary fasteners for attaching the enclosure to the mounting bracket. The system may be used, for example, to house emergency equipment for use onboard the aircraft.

Yet another aspect of the present disclosure provides a method for temporarily increasing the accessible storage capacity of a passenger aircraft, comprising the steps of: determining how to utilize a space in an accessible area of the passenger aircraft; detaching an existing component located within an accessible area of the passenger aircraft, the existing component utilizing an attachment system; replacing the existing component with a storage unit having a profile substantially similar to the existing component; and fastening the storage unit to a support frame using the attachment system of the existing component. As described herein, the method may be used to replace a floor-mounted component, such as an attendant seat, with a storage unit.

Other systems, methods, features, and advantages of the present disclosure will be or become apparent to one with skill in the art upon examination of the following drawings and detailed description. The features, functions and advantages that have been discussed can be achieved independently in various configurations of the present disclosure or may be combined in yet other configurations further details of which can be seen with reference to the following description and drawings.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is an exemplary illustration of a fully assembled storage unit;

FIGS. 6A and 6B are exemplary illustrations showing different uses of the storage unit of the present disclosure;

DETAILED DESCRIPTION

In the following description, reference is made to the accompanying drawings, which form a part hereof, and in which is shown, by way of illustration, various configurations of the present disclosure. It is understood that other embodiments may be utilized and changes may be made without departing from the scope of the present disclosure.

Figure 1:
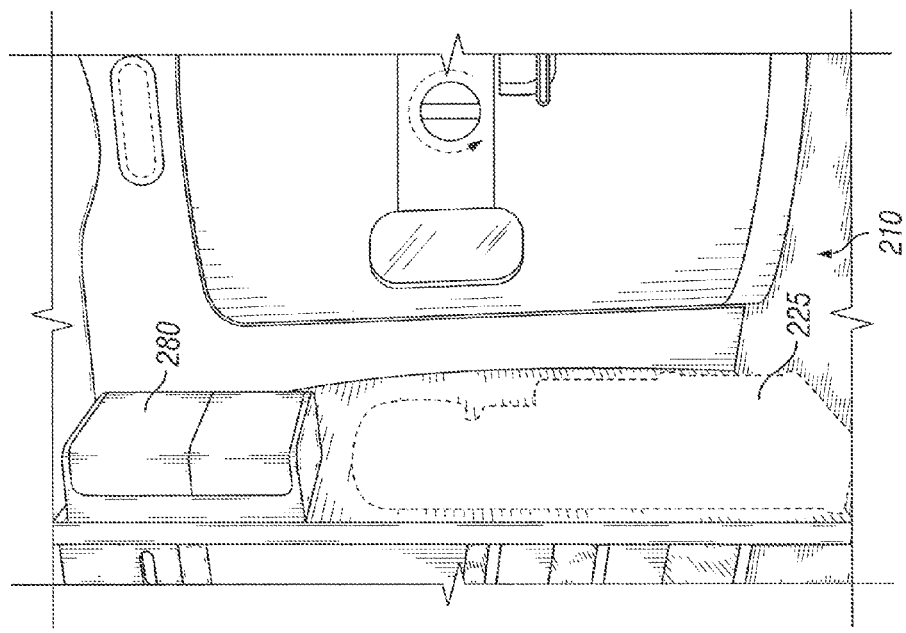
FIG. 1 is an illustration of the prior art, depicting a portion of a cabin in a passenger aircraft having an attendant seat.
Figure 2A:
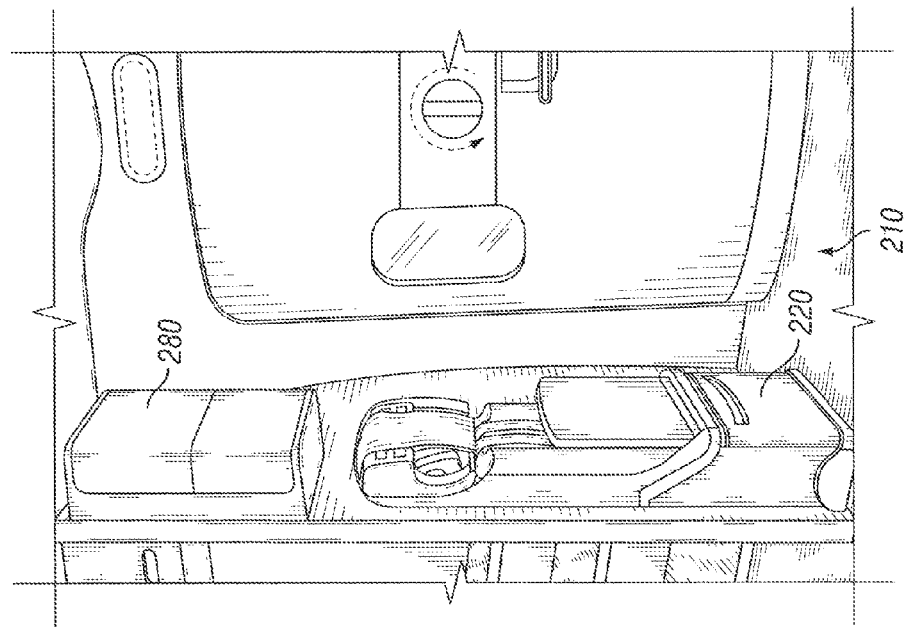
FIG. 2A is an illustration of the passenger aircraft showing the approximate profile of the attendant seat.
Figure 2B:
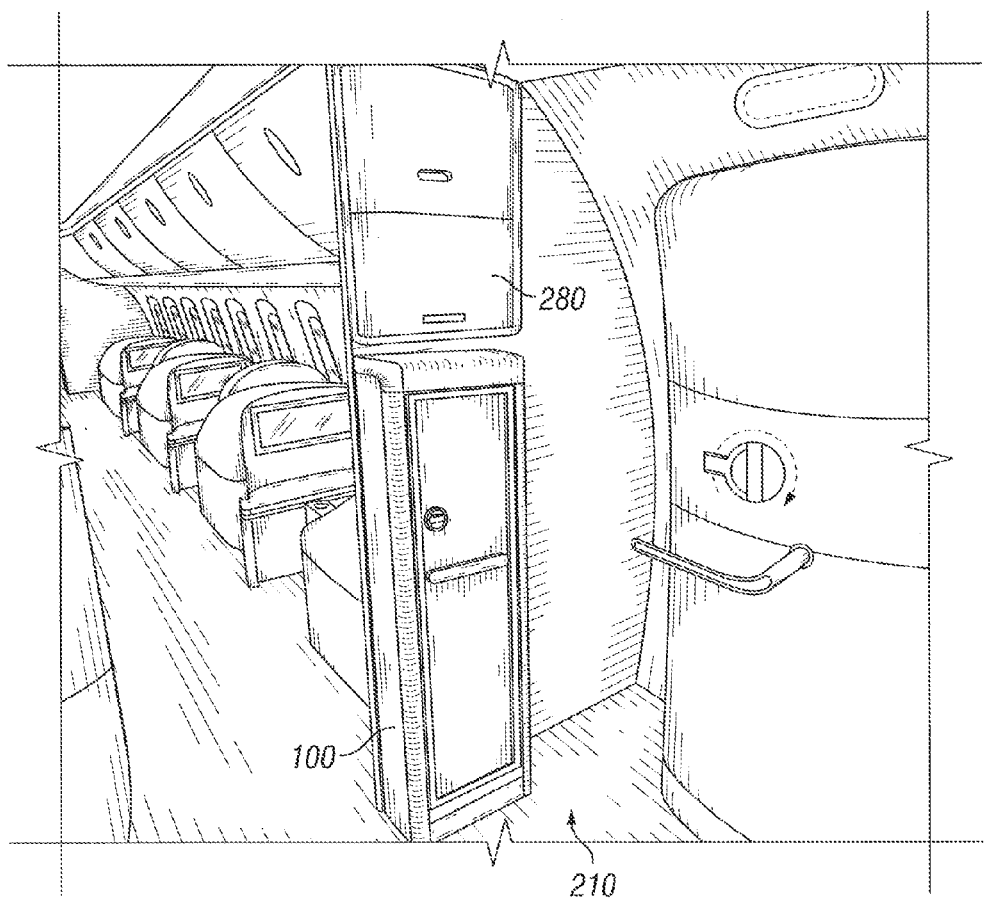
FIG. 2B is an exemplary illustration showing a fully installed storage unit in place of an attendant seat.

FIG. 1 is an illustration of a portion of a of a passenger aircraft cabin 210, showing an attendant seat 220 and a wall-mounted attendant station 280, as used in the prior art. Passenger aircraft cabin may also be described as an accessible area of a passenger aircraft. FIG. 2A is an illustration of the same portion of passenger aircraft cabin 210, wherein the profile 225 represents the three-dimensional space taken up by the attendant seat 220 of the prior art. FIG. 2B, similarly shows a portion of the passenger aircraft cabin wherein a storage unit 100 has been installed in place of the attendant seat 220.

Figure 3:
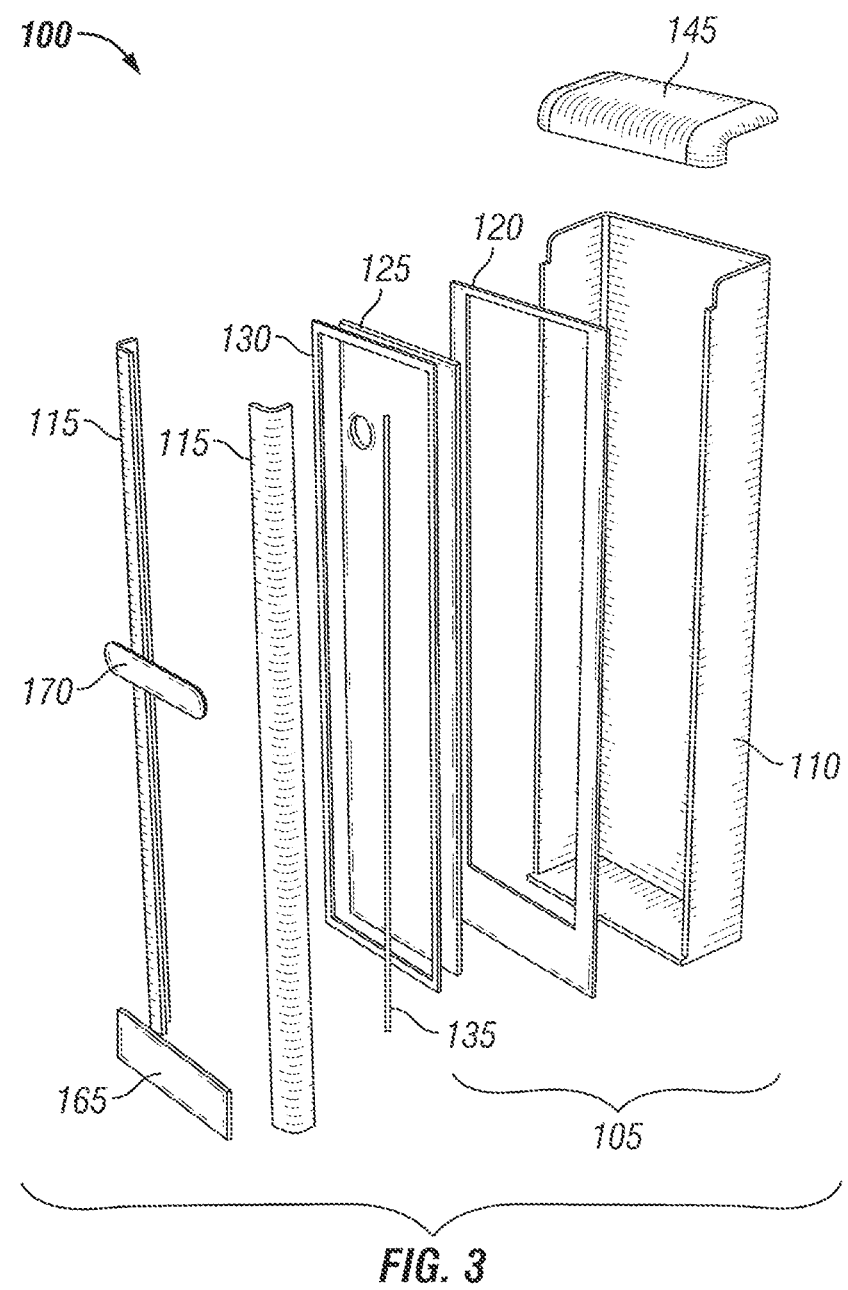
FIG. 3 is an exploded view of an exemplary storage unit in accordance.

FIGS. 3 and 5 illustrate one configuration a storage unit 100 in accordance with the present disclosure for use in a passenger aircraft cabin 210, wherein the figures show the features of the storage unit 100 in exploded and fully assembled views, respectively. The storage unit comprises an enclosure 105, which is in turn comprised of a compartment 110, top cap 145, front wall 120, as well as vertical rails 115. A door 125 is set in a door frame 130 and placed in front wall 120. The door includes a hinge 135 and a latch 140. Finally, the storage unit 100 may further include a kickstrip 165 and a rub strip 170.

Figure 4A:
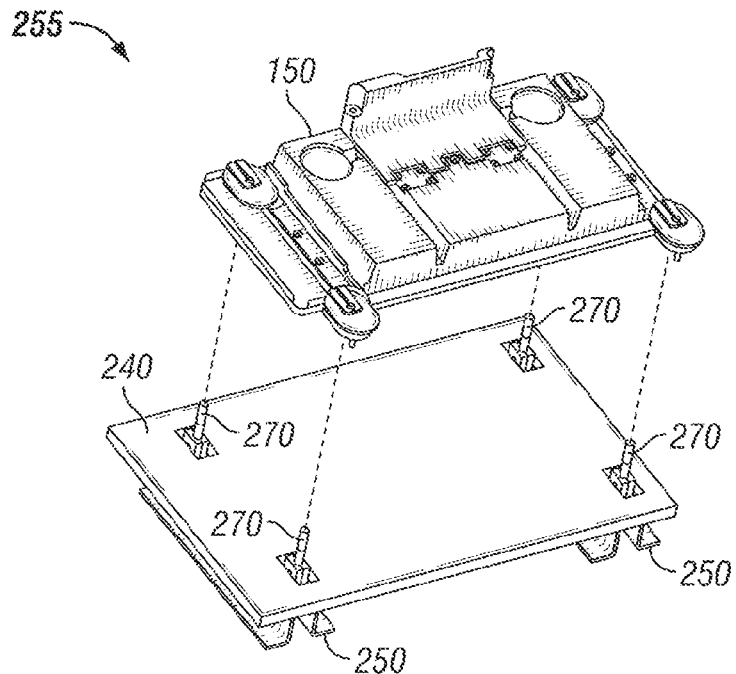
FIGS. 4A and 4B are illustrations showing an attachment system for an attendant seat in accordance with one example of the prior art.
Figure 4B:
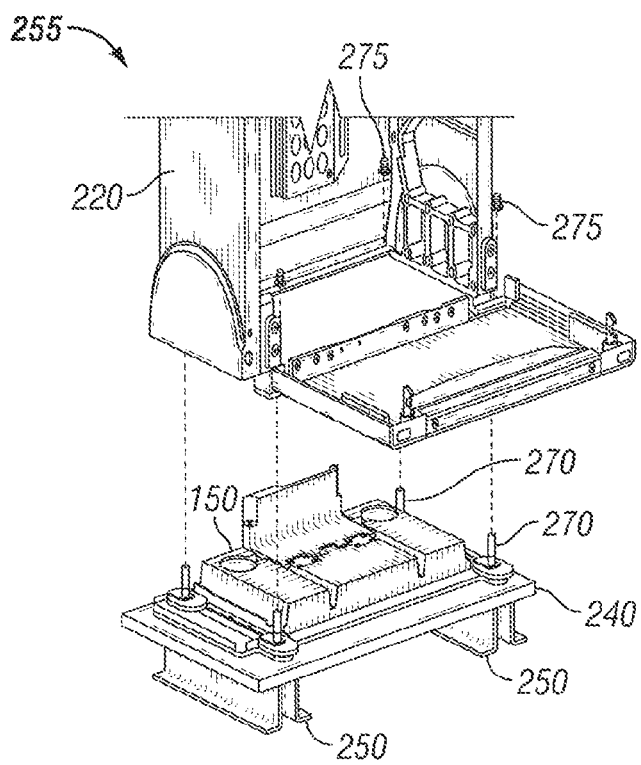

FIGS. 4A and 4B illustrate an exploded view of an attachment system 255 for a floor-mounted attendant seat 220 in accordance with one configuration found in the prior art, and which may be used in connection with the storage unit 100 described herein. In FIG. 4A, a mounting plate 150 is arranged on the aircraft floor 240 and is attached to the support frame 250 by a plurality of fasteners 270. In FIG. 4B, an attendant seat 220 is fastened to the mounting plate 150 using secondary fasteners 275.

Referring again to FIGS. 3 and 5, the enclosure 105 of storage unit 100 is formed of one or more pieces and encloses a cavity, wherein items can be stored as desired. The illustrated configuration depicts an enclosure comprising a compartment 110, a front wall 120, vertical rails 115, and a top cap 145. The enclosure also includes the door 125, which is described in detail below. The construction may be segmented as described, or further as necessary, to accommodate manufacturing processes. In particular, where the enclosure is a resilient structure with a high strength to weight ratio, various elements of the enclosure may be formed from a composite material, such as a fibrous material and epoxy mixture or similar material. Accordingly, the construction may require formation of the various elements where the structure may be difficult to form as a unitary piece or where various elements, such as the top cap 145, are designed to be metallic, polyethylene, or the like. Alternatively, the enclosure, aside from the door, may be molded into a unitary piece.

The vertical rails 115 may be included with the enclosure to add strength to the structure. This added measure reduces the risk of damaging the contents of the storage unit 100 in the event of an incident, such as a collision with a meal cart during turbulence or other accident. The vertical rails may be included in the interior of the enclosure 105, or may form a portion of the exterior as shown. Alternatively, where the enclosure is constructed from various elements, the vertical rails may be used to connect the compartment 110 to the front wall 120 and/or to the top cap 145. For example, commonly owned U.S. Pat. No. 8,047,467, incorporated herein by reference, discloses a configuration of rails used to unite various panels into a closet.

The enclosure 105 is completed by the inclusion of a door 125, which may be arranged in the front wall 120. Each door comprises a hinge 135, which may be a piano-type hinge, and a latch, which may be chosen to match the architecture of a particular aircraft. The latch 140 may be a round, rotating latch, as shown, or may be any other type of latch, including for example a button latch, a sliding bolt, a door knob, a magnetic latch, a hook and eye system, or the like. Alternatively, the enclosure 105 may be fitted with multiple doors, wherein the compartment 110 may be separated into a plurality of discrete cavities. A door may be located in the front wall 120, as shown, or on any particular side or combination of sides that suits a particular application.

The door 125 may be arranged on the enclosure using a door frame 135, or may be mounted flush with the front wall 120. The door frame 135 may provide a seal to preserve the contents of the storage unit 100 in case of a pressure loss or other circumstance. The door frame may also be used to provide an improved installation process, wherein the hinge is easily mounted to the door frame prior to installation.

The storage unit 100 further comprises a mounting plate 150, an example of which is shown in FIGS. 4A and 4B. In some examples, the mounting plate 150 is separate and distinct from the enclosure 105, but is securely attached to the enclosure 105 when installed. The mounting plate 150 may alternatively be formed integral with the enclosure 105. For example, the enclosure may include the mounting plate 150 in the base of the enclosure, or on a wall as the case may be. The mounting plate 150 allows the storage unit 100 to be securely attached to a support frame 250 of the aircraft using fasteners 270. Where the enclosure 105 is separate from the mounting plate 150, the enclosure may be attached to the mounting plate 150 using secondary fasteners 275. The fasteners 270 and secondary fasteners 275 may be any combination of fasteners known in the art, including threaded bolts, locking pins, clips, hooks, hook and eye devices, adhesives, clamps, or the like.

In some configurations the fasteners 270 and mounting plate 150 may be designed to interface with an attachment system 255, such as an existing attachment system that may be used to attach an attendant seat 220 or other modular feature of the passenger aircraft cabin 210. The fasteners 270 and mounting plate 150 may also be designed for the attachment system 255 where the attachment system 255 comprises a unique design. The support frame 250 may comprise one or more floor joists, wall supports, or other structural elements.

The storage unit 100 may include other functional elements, such as the kickstrip 165 and rub strip 170 shown. These elements may perform some aesthetic purpose and add to the durability of the storage unit 100.

FIGS. 6A and 6B illustrate additional configurations of the storage unit 100, wherein the contents of the storage unit 100 are for a variety of purposes. FIG. 6A illustrates an configuration wherein the storage unit 100 is installed to house emergency equipment 190, such as fire extinguishers, first aid kits, etc. FIG. 6B illustrates another configuration, wherein the storage unit 100 serves to house a variety of items in a plurality of bins 195. A host of other configurations, including shelves, drawers, hooks, etc., are also possible and are intended to be within the scope of this disclosure.

As shown in FIG. 2B, (and in FIG. 6A), the storage unit 100 may be aesthetically designed to seamlessly integrate with the wall mounted attendant modules located directly above the attendant seat. For example, some BOEING wall-mounted attendant stations are described in U.S. Design Pat. Nos. D631,446; D615,045; and D604,254, which are incorporated herein by reference. Without regard to what contents the storage unit 100 is intended to store in a particular application, the storage system may be matched to a particular attachment system and architectural design.

Figure 7A:
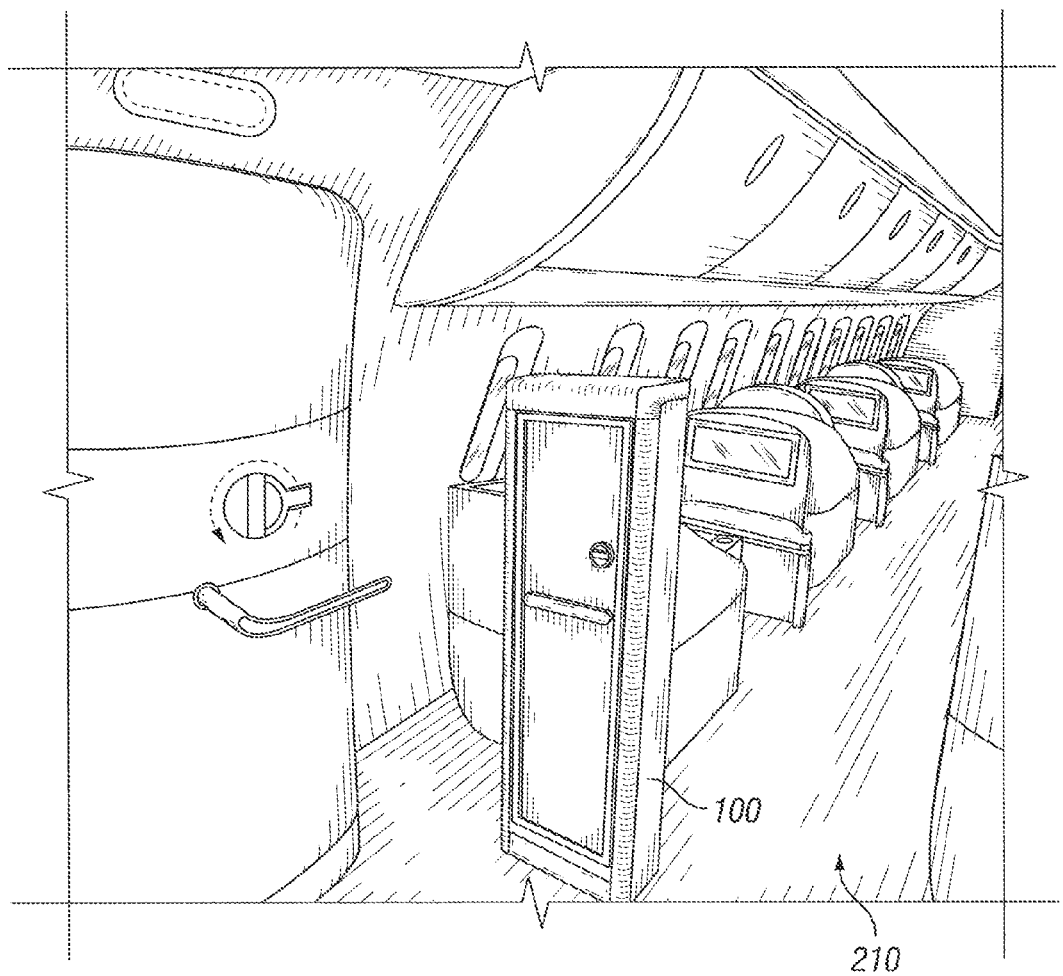
FIGS. 7A and 7B are exemplary illustrations of different examples of a fully assembled and installed storage unit.
Figure 7B:
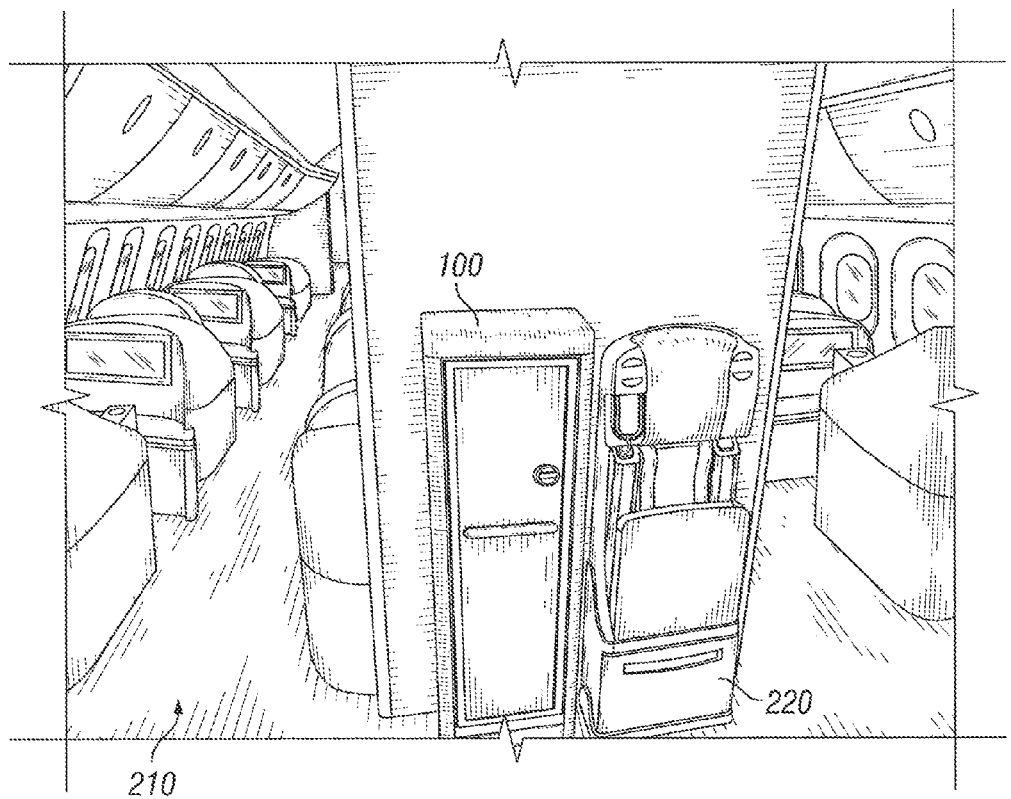

As shown in FIGS. 7A and 7B, the storage unit 100 and system of the present disclosure may be used in a variety of configurations. FIG. 7A shows a storage unit 100 installed in the passenger aircraft cabin 210 behind a row of seats. In this configuration, the storage unit 100 is attached to a support frame in the floor of the aircraft, which provides adequate support for the resilient structure of the storage unit. FIG. 7B shows the storage unit 100 installed in the passenger aircraft cabin 210 adjacent to an attendant seat 220. Many other configurations are enabled by the present disclosure and within the scope thereof, as will be apparent to those with skill in the art.

In operation, the storage unit 100 enables aircraft operators and manufacturers to pattern allows Airlines to add additional stowage capacity without making costly changes to the aircraft. In particular, anywhere there is attendant seat floor structure the storage system described herein can be used to augment the secure storage capacity of the aircraft. For example, an Airline after delivery may choose to add additional equipment due to various reasons such as revised route structure or increased seating capacity. The storage system of the present disclosure allows for this customization with minimal impact.

Figure 8:
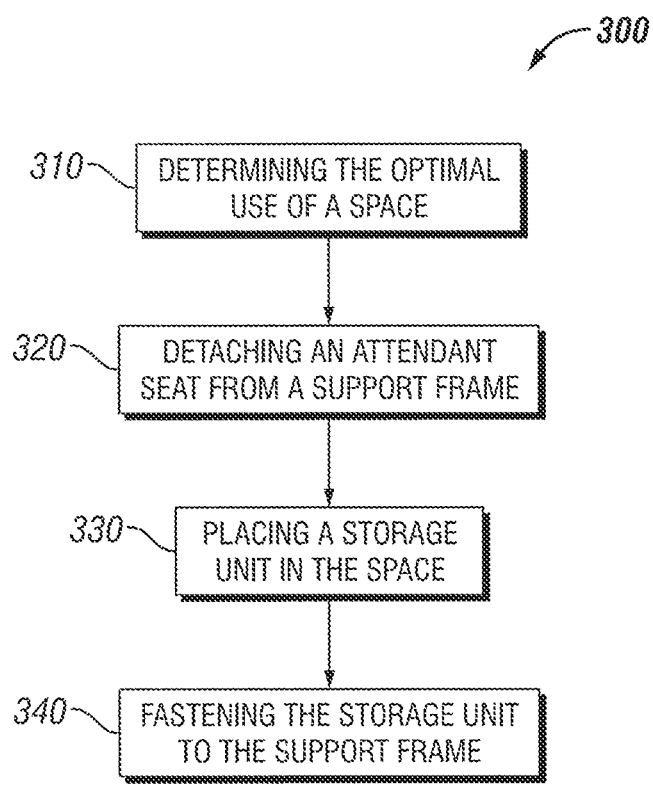
FIG. 8 is an exemplary flowchart depicting a method for employing a storage unit to provide additional storage space.

FIG. 8 illustrates one configuration of a method for implementing the storage unit 100 of the present disclosure. The method 300 for temporarily increasing the accessible storage capacity of a passenger aircraft comprises a step 310 of determining the optimal use of a particular space in a passenger aircraft cabin. This decision will be based upon current needs of the Airline and experience with the use of a particular aircraft for a specific purpose. The method 300 further comprises a step 320 of detaching an existing component from a support frame, such as an attendant seat, from a support frame 250 and removing that existing component from the passenger aircraft cabin 210, or relocating the component to another position. The next step 330 is to place the storage unit 100 in the particular space. Finally, the method comprises the step 340 of fastening the storage unit 100 to the support frame 250.

This storage system of the present disclosure provides attendants with immediate access to emergency equipment of other flight attendant related items. It has also been designed to provide airline configuration flexibility. The disclosure thereby provides a consistent and organized way of providing airlines and flight attendants with the features that they utilize while creating a cabin interior that is clean, organized, and may reflect the design characteristics of a particular aircraft architecture.

It should be emphasized that the above-described configurations of the present device and process are merely possible examples of implementations and merely set forth for a clear understanding of the principles of the disclosure. Many different configurations of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

What is claimed is:

1. A storage unit configured to be placed in an accessible area of a passenger aircraft, the passenger aircraft having an attachment system configured to attach an attendant seat at an attachment location, comprising:
    an enclosure, the enclosure having a profile that is substantially similar to a profile of the attendant seat located in the accessible area of the passenger aircraft, the enclosure further comprising:
    a door providing access to an interior of the enclosure; and
    a mounting plate having a configuration to match the attachment system of the attendant seat at the attachment location.

2. The storage unit of claim 1, wherein the attendant seat is floor-mounted.

3. The storage unit of claim 1, wherein the enclosure is a substantially unitary piece.

4. The storage unit of claim 1, wherein the enclosure further comprises:
    a resilient structure forming a compartment;
    a front wall enclosing the area of the compartment, wherein the door is arranged in the front wall;
    a latch for securing the door;
    at least one vertical rail; and
    a top cap.

5. The storage unit of claim 4, wherein the resilient structure further comprises a kickstrip.

6. The storage unit of claim 1, wherein the mounting plate is separable from the enclosure when the storage unit is not fully assembled.

7. A storage system forming a modular storage unit of a passenger aircraft, the passenger aircraft having a support frame and an attachment system configured to attach a floor-mounted attendant seat at an attachment location, comprising:
    an enclosure having a door providing access to an interior of the enclosure;
    a latch for securing the door;
    a mounting plate located at a base of the enclosure, the mounting plate configured to interface with the attachment system of the attendant seat; and
    a plurality of fasteners that attach the mounting plate to the support frame of the passenger aircraft at the attachment location, wherein the enclosure, when attached, replaces the floor-mounted attendant seat previously attached at the attachment location in an accessible area of the passenger aircraft.

8. The storage system of claim 7, wherein the enclosure is a substantially unitary piece.

9. The storage system of claim 7, wherein the enclosure is formed of a composite material.

10. The storage system of claim 7, further comprising one or more vertical rails forming a part of the enclosure.

11. The storage system of claim 7, wherein the plurality of fasteners form part of the existing attachment system that is used to attach the floor-mounted attendant seat.

12. The storage system of claim 7, wherein the enclosure comprises one or more rounded edges.

13. The storage system of claim 7, wherein the enclosure comprises an emergency equipment storage unit.

14. The storage system of claim 7, wherein the support frame comprises at least one floor joist.

15. The storage system of claim 7, further comprising a plurality of secondary fasteners that attach the enclosure to the mounting plate.

16. A method for temporarily increasing the accessible storage capacity of a passenger aircraft having a support frame and an attachment system configured to attach an attendant seat at an attachment location, comprising the steps of:
- determining how to utilize a space in an accessible area of the passenger aircraft;
- detaching the attendant seat from the attachment location within the accessible area of the passenger aircraft, the attendant seat utilizing the attachment system;
- replacing the attendant seat with a storage unit having a profile substantially similar to the attendant seat;
- fastening the storage unit to the support frame at the attachment location using the attachment system of the attendant seat.

17. The method of claim 16, wherein the attendant seat is a floor-mounted attendant seat.

18. The method of claim 16, wherein the storage unit is a substantially unitary piece.

19. The method of claim 16, wherein the attachment system attaches to a support frame comprising at least one floor joist.

20. The method of claim 16, wherein the storage unit comprises an enclosure and a mounting plate, and wherein the step of fastening the storage unit comprises:
- attaching the mounting plate to the support frame; and
- attaching the enclosure to the mounting plate.

* * * * *